Figure 1:
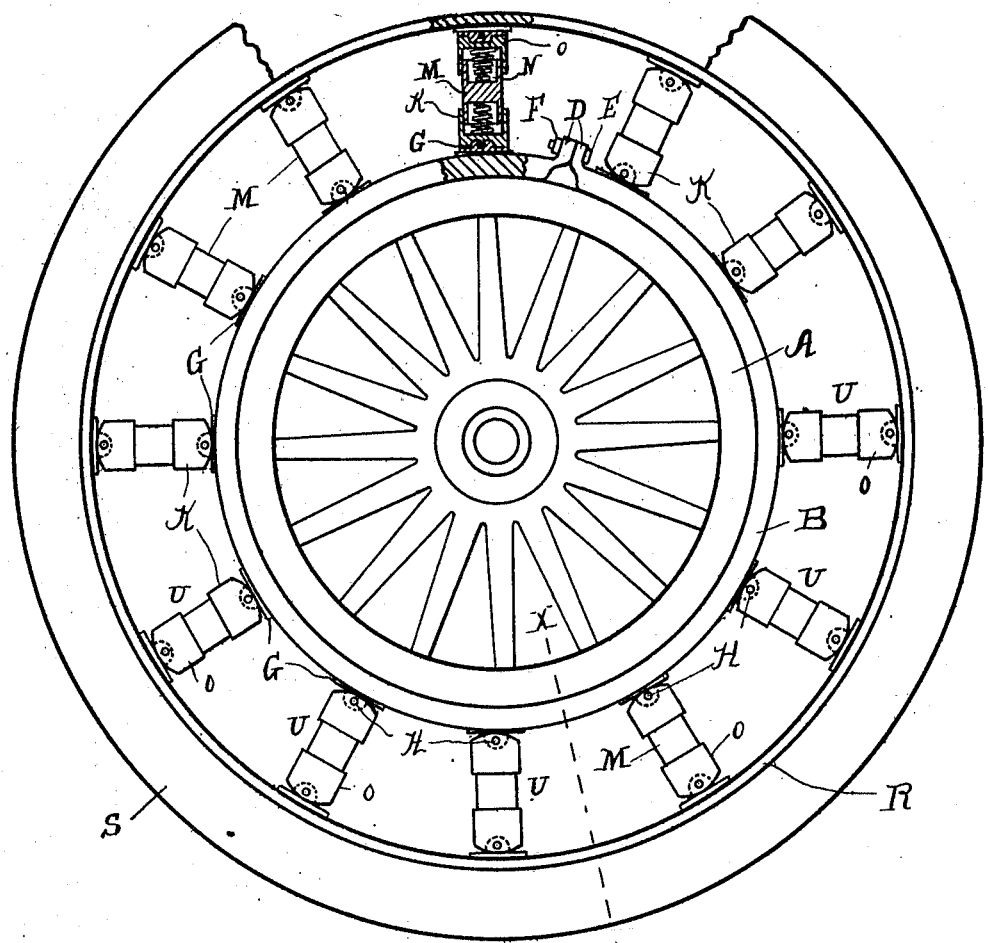

H. L. KEIPER & F. W. CARLTON.
ATTACHMENT FOR VEHICLE WHEELS.
APPLICATION FILED APR. 1, 1909.

992,879.

Patented May 23, 1911.
2 SHEETS—SHEET 1.

WITNESSES
S. M. Gallagher
H. A. Burton

INVENTORS
Howard L. Keiper
BY Frank W. Carlton

ATTORNEY

H. L. KEIPER & F. W. CARLTON.
ATTACHMENT FOR VEHICLE WHEELS.
APPLICATION FILED APR. 1, 1909.
992,879.
Patented May 23, 1911.
2 SHEETS—SHEET 2.
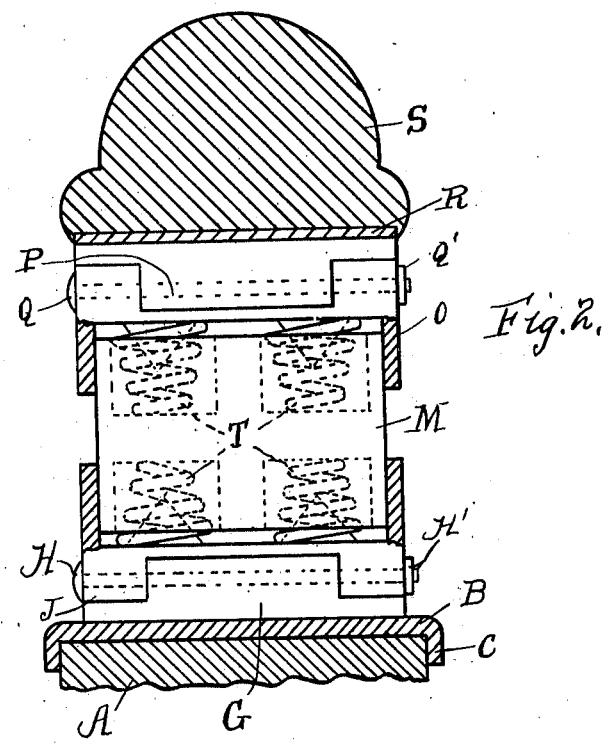
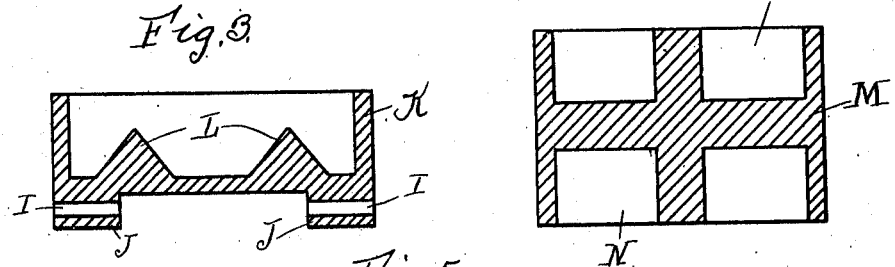
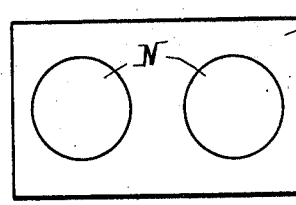
WITNESSES
INVENTORS
Howard L. Keiper
Frank W. Carlton

UNITED STATES PATENT OFFICE.

HOWARD L. KEIPER AND FRANK W. CARLTON, OF EASTON, PENNSYLVANIA.

ATTACHMENT FOR VEHICLE-WHEELS.

992,879.  Specification of Letters Patent. Patented May 23, 1911.

Application filed April 1, 1909. Serial No. 487,194.

*To all whom it may concern:*

Be it known that we, HOWARD L. KEIPER and FRANK W. CARLTON, citizens of the United States, residing at Easton, in the county of Northampton and State of Pennsylvania, have invented a certain new and useful Improvement in Attachments for Vehicle-Wheels, of which the following is a specification.

Our invention relates to a new and useful improvement in attachments for vehicle wheels, and has for its object to so construct such attachment as to produce a spring or cushion action between the tire and the hub of a wheel whereby the jar and vibration incident to the wheel traveling over a roadbed will be largely absorbed within the wheel instead of being transmitted to the vehicle and the occupants.

With these ends in view, this invention consists in the details of construction and combination of elements hereinafter set forth and then specifically designated by the claim.

In order that those skilled in the art to which this invention appertains may understand how to make and use the same, we will describe its construction in detail, referring by letter to the accompanying drawing forming a part of this specification, in which—

Figure 1 is a side elevation of a part of a wheel showing our improvement secured thereto, portions thereof being shown in section. Fig. 2, a section at the line $x$—$x$ of Fig. 1, portions of the rectangular casings being shown in section. Fig. 3, a longitudinal sectional view of one of the casings. Fig. 4, a similar view of one of the blocks, and Fig. 5, a plan view of one of the blocks.

In carrying out our invention as here embodied, A represents a vehicle wheel, to which is detachably secured to metallic ring B, having the inwardly projecting flanges C formed integral with both edges thereof. Said ring is formed of a single piece of material having the meeting ends D bent outward, and through these bent up ends passes the bolt E, on which is threaded the nut F, so that the ring will be securely fastened to the wheel of the vehicle, and the inwardly projecting flanges C will prevent the ring from slipping sidewise from the wheel. Mounted on this ring are the knuckles G, through which pass the bolts H, said bolts also passing through the openings I in the knuckles J formed with the rectangular casings K, said casings having formed therewith internal integral conical shaped lugs L, and on the ends of the bolts H are threaded the nuts H'.

In the casings K are slidably mounted the blocks M provided with a number of oppositely disposed openings N, said blocks also being slidably mounted in the casings O, which are similar to the casings K, and said casings O are movably secured to the knuckles P by the bolts Q, on the ends of which are threaded the nuts Q', said knuckles being mounted on the rim R, to which may be attached a tire S.

T represents a number of coiled springs, one end of which rests in the casings O and K about the conical projections L, the opposite ends resting in the openings N, in the blocks M.

From the foregoing description it will be seen that we have produced an attachment for vehicle wheels which is in the form of a number of spring spokes U interposed between the wheel of the vehicle and the tire.

In practice a wheel made in this manner when striking any obstruction while traveling over a roadbed will absorb the greater portion of the jar which would otherwise be transmitted to the vehicle, the effect being to force the rim of the attachment upward toward the vehicle wheel against the action of the springs T, and as each of the rectangular casings are secured to the knuckles on the ring B and the rim R by but one bolt, it will permit the spokes which are on a horizontal line to move slightly upward when said obstruction is encountered, thus preventing the parts being broken.

Having thus fully described our invention, what we claim as new and useful, is—

A resilient wheel comprising a hub and an outer rim, an inner rim supported on the hub, an annular ring fitted on said inner rim and removable therefrom, a series of lugs on said ring, a cup pivoted to each lug, a cone extending from the base of each cup, a coil spring resting in said cup and centered upon said cone, a cap telescoping within said cup and over said coil spring, said cup having a compartment in its outer end, a coil spring arranged in said compartment, a cap pivoted to the outer rim and telescoping over the outer end of each cap and forming an abutment for the outermost coil spring, and a cone extending inwardly from said cap for centering said spring in said compartment.

In testimony whereof, we have hereunto affixed our signatures in the presence of two subscribing witnesses.

HOWARD L. KEIPER.
FRANK W. CARLTON.

Witnesses:
JOHN KETCHLEDGE,
GEORGE L. CLYMER.